July 13, 1965
J. H. SCOTT
3,194,069
URINOMETER
Filed Dec. 26, 1962
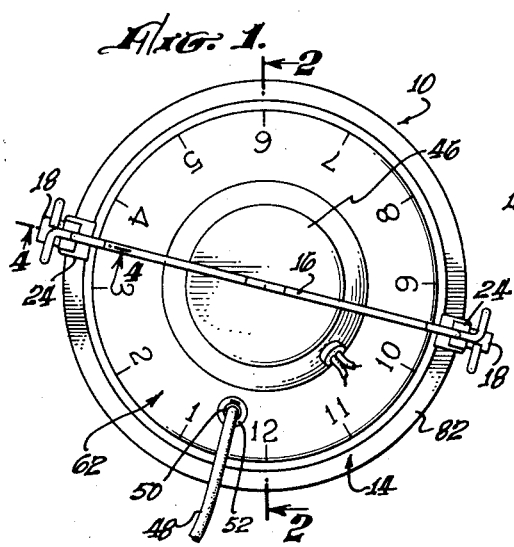
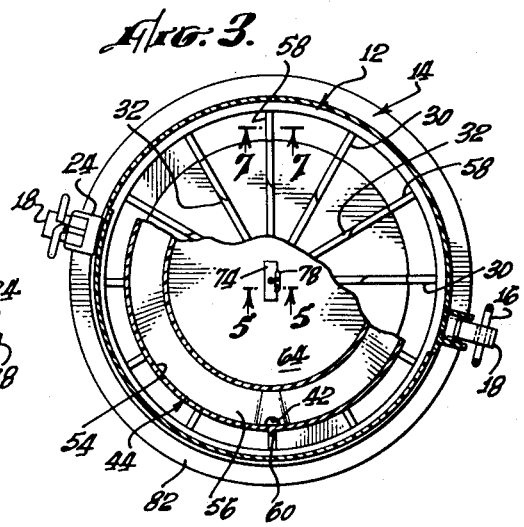
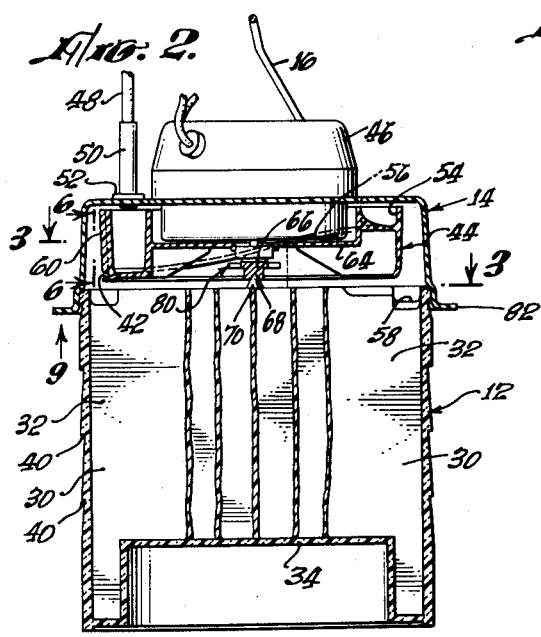
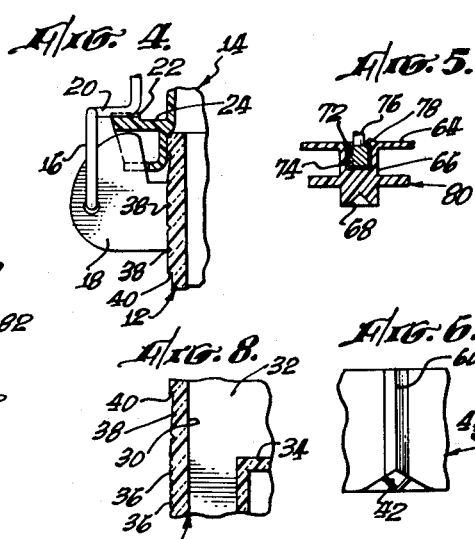
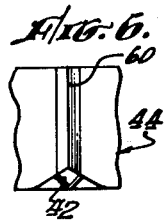
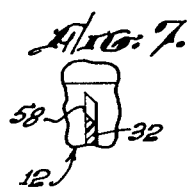
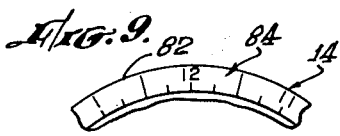
JAMES H. SCOTT,
INVENTOR.
BY HIS ATTORNEYS.
HARRIS, KIECH, RUSSELL & KERN.

United States Patent Office 3,194,069
Patented July 13, 1965

1

3,194,069
URINOMETER
James H. Scott, Los Angeles, Calif., assignor to
William B. Carrigan, Santa Ana, Calif.
Filed Dec. 26, 1962, Ser. No. 246,983
11 Claims. (Cl. 73—219)

The present invention relates in general to a device, hereinafter termed a urinometer, for measuring urine output, and a primary object of the invention is to provide a urinometer capable of automatically and accurately measuring and recording volumetric output during each of a series of predetermined time intervals throughout a predetermined time span. For example, the automatic urinometer of the invention is preferably designed to measure and record hourly urine volume throughout a twelve-hour period.

It has been well established that consistently accurate and reliable hourly urine output data are essential to the proper care of the critically ill surgical patient in particular, the rate of urine output providing an excellent barometer reflecting the patient's condition and response to treatment. The basic object of the present invention is to provide a urinometer capable of providing the necessary data with accuracy and in a reliable manner.

Other general objects of the invention are to provide a urinometer which is capable of functioning at the patient's bedside (the patient's urine output being continuously delivered thereto through a urinary drainage tube connected to a catheter inserted into the patient's bladder), which is of simple construction so that it may be cleaned and sterilized readily to preclude its being a bacteriological hazard to the patient, which is easy to use so that it can be operated by relatively unskilled hospital personnel, and which is relatively inexpensive. Another object in this connection is to utilize the urinometer of the invention with a urinary drainage tube having a small total volume which minimizes variations in urine storage within the tube with the activity of the patient.

Considering more specific objects of the invention, a basic one is to provide a urinometer which comprises: a housing including an upright, preferably cylindrical, container partitioned into compartments of equal angular extents angularly spaced about the axis of the container; a rotary urine receptacle rotatable about the axis of the container above the compartments therein and having a drainage opening which is sequentially positionable above and in gravity communication with the compartments as the receptacle rotates so as to discharge urine into the compartments in sequence; means carried by the housing and connected to the rotary urine receptacle for rotating it at a constant, predetermined speed so as to maintain the drainage opening above and in communication with the compartments in sequence throughout equal, predetermined time intervals; and means for continuously delivering urine from a urinary drainage tube connected to the patient into the rotary urine receptacle. Preferably, the container is partitioned into twelve equal compartments and the rotary urine receptacle is rotated through one revolution every twelve hours, whereby to obtain hourly urine measurements and records throughout a twelve-hour period.

Another object of the invention is to provide a device of the foregoing nature wherein the drainage opening in the rotary urine receptacle is circumferentially narrow and wherein the partitions in the container have knife edges at their upper ends below the path of the drainage opening, so as to provide a sharp cutoff of the gravity flow of urine from the drainage opening as it rotates from a position above one compartment to a position above the next. Another object in this connection is to provide a drainage opening in the rotary urine receptacle which extends generally radially outwardly and which is V-shaped in cross section to form a circumferentially-thin urine stream to provide, in cooperation with the knife edges at the upper ends of the partitions, a sharp cutoff of the urine flow into each compartment.

Another object is to provide a urinometer wherein the rotary urine receptacle includes an annular trough having a bottom wall sloping downwardly to the drainage opening mentioned, whereby the urine entering the receptacle continuously flows downwardly along the sloping bottom wall of the trough to the drainage opening for continuous discharge into the compartment above which the drainage opening is located.

An important object of the invention is to provide each compartment with a portion of reduced cross sectional area at its lower end so as to produce amplified indications of small urine outputs for easier and more accurate reading thereof.

Another object of the invention is to provide a urinometer wherein the container is open at its upper end and is provided with a cover releasably securable thereto, an electric motor for rotating the rotary urine receptacle once every twelve hours being mounted on the cover. Another object in this connection is to locate the rotary urine receptacle within the cover and to releasably connect it to the motor in such a manner that the receptacle is removed with the cover upon removal of the cover, but can then be detached readily for cleaning and sterilization. Still another object in this connection is to provide thrust bearing means on the rotary urine receptacle and on the partition means in the container for carrying the weight of the rotary urine receptacle when the urinometer of the invention is in operation.

Still another object is to provide a urinary drainage tube having at its end a plug which can simply be plugged into an opening in the cover above the annular trough of the rotary urine receptacle in such a manner as to preclude bringing the urine into contact with the cover. With the foregoing construction, urine contact with the cover and the motor is prevented, the urine coming into contact only with the drainage tube, the rotary urine receptacle, and the compartmented container. Consequently, cleaning and sterilization are facilitated, which is an important feature.

Another object of the invention is to form the container of a transparent material having suitable graduations thereon for indicating the urine volume in each compartment, preferably in cubic centimeters. The reduced-area bottom portion of each compartment is preferably more finely graduated to facilitate reading the volumes of small urine outputs.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawing, in which:

FIG. 1 is a plan view of a urinometer which embodies the invention;

FIG. 2 is a vertical sectional view thereof taken as indicated by the arrowed line 2—2 of FIG. 1;

FIG. 3 is a horizontal sectional view taken as indicated by the irregular arrowed line 3—3 of FIG. 2;

FIG. 4 is an enlarged, fragmentary sectional view taken along the arrowed line 4—4 of FIG. 1;

FIG. 5 is an enlarged, fragmentary sectional view taken along the arrowed line 5—5 of FIG. 3;

FIG. 6 is an enlarged, fragmentary elevational view taken as indicated by the arrowed line 6—6 of FIG. 2;

FIG. 7 is an enlarged, fragmentary sectional view taken along the arrowed line 7—7 of FIG. 3;

FIG. 8 is an enlarged, fragmentary sectional view duplicating a portion of FIG. 2 on a larger scale; and FIG. 9 is a fragmentary elevational view taken as indicated by the arrow 9 of FIG. 2 of the drawing.

The urinometer of the invention is designated generally by the numeral 10 and comprises a housing which includes an upright cylindrical container 12 having an open upper end closed by a removable cover 14. The latter is provided with an internal annular shoulder which is seatable on the rim of the open upper end of the container 12, the cover being secured by a bail 16 which also serves as a carrying handle. More particularly, the ends of the bail 16 are pivotally connected to diametrally opposite ears 18 on the container 12 and have offset portions 20 which snap into radial grooves 22 in the upper surfaces of diametrally opposite ears 24 on the cover 14. With this construction, the cover 14 is securely held in place when the bail 16 is in its locking, carrying position. However, the cover 14 may be installed and removed readily upon pivoting of the bail 16 into its inoperative position in a manner which will be apparent.

Considering the container 12 in more detail, it is partitioned into twelve compartments 30 of equal angular extents by a partition means which includes twelve uniformly-circumferentially-spaced radial partitions 32. With this construction, hourly urine measurements can be obtained throughout a twelve-hour period in a manner to be described.

In order to provide amplified indications of small urine volumes in the compartments 30, the container 12 is provided with a bottom wall having a circular central portion 34 located at an elevated level. This reduces the cross-sectional area of a portion of each compartment 30 at the lower end thereof to provide a higher rate of urine level rise for a given volume. Preferably, the volume of the reduced-area lower portion of each compartment 30 is of the order of twenty cubic centimeters.

In order to permit visual observation of the urine level in each compartment 30, at least the side wall of the container 12 is made of transparent material, such as a suitable transparent plastic. However, the entire container 12, including the partitions 32, may be made of the same material.

The side wall of the container 12 is provided with indicia registering the urine volume in each compartment 30, such indicia preferably comprising circumferential grooves 36 and 38 and shoulders 40 formed in the external surface of the side wall of the container 12 and extending entirely around the container. The grooves 36 are located opposite the reduced-area lower portions of the compartments 30 and indicate urine level variations in such portions by increments of one cubic centimeter. The grooves 38 are preferably spaced apart increments of ten cubic centimeters, and the shoulders 40 increments of fifty cubic centimeters. Thus, each compartment 30, with the preferred construction described, has a capacity of two hundred cubic centimeters.

To provide hourly indications of urine output, successive hourly outputs are delivered to successive compartments 30 by a drainage opening 42 in a rotary urine receptacle 44 rotatable about the axis of the urinometer 10 and driven by an electric clock motor 66 which is suitably mounted on the cover 14 and which rotates the receptacle 44 one revolution in twelve hours at a constant speed. The patient's urine output is delivered to the rotary urine receptacle 44 through a urinary drainage tube 48 connected to a catheter inserted into the patient's bladder. The lower end of the drainage tube 14 terminates in a plug 50 which is inserted into an opening in the cover above the receptacle 44, insertion of the plug 50 being limited by an annular flange 52 thereon. With this construction, the urine flows by gravity into the receptacle 44 by way of the drainage tube 48 and the plug 50, without contacting the cover 14.

Considering the rotary urine receptacle 44 in more detail, it comprises an annular trough 54 located below the urine inlet plug 50 and having a bottom wall 56 which continuously slopes downwardly toward the drainage opening 42 so as to assure constant and uniform urine drainage to the drainage opening. The drainage opening 42 is circumferentially narrow and has the form of a spout which extends generally radially outwardly and which is of V-shaped cross section, as best shown in FIG. 6. Such V-shaped drainage opening 42 provides a circumferentially-thin urine stream which falls by gravity into successive compartments 30 as the receptacle 44 rotates. The upper ends of the partitions 32 below the path of the drainage opening 42 are provided with knife edges 58, as best shown in FIG. 7 of the drawing. The circumferentially-narrow drainage opening 42 and the knife edges 58 at the upper ends of the partitions 52 cooperate to provide a sharp cutoff of the urine stream at the end of each one-hour interval. This insures urine delivery into each compartment 30 for precisely one hour to obtain maximum accuracy, which is an important feature.

The rotary urine receptacle 44 is provided on its periphery with a pointer 60 vertically aligned with the drainage opening 42 and movable relative to a clock face 62 on the cover 14 and readable from above the urinometer 10. In the construction illustrated, the pointer 60 takes the form of a vertical rib of V-shaped cross section vertically aligned with the drainage opening 42. As will be apparent, when the urinometer 10 is placed in operation, the pointer 60 is initially located opposite the indicium "12" on the clock face 62 so that the urine output of the patient is first delivered into the compartment 30 corresponding to the interval between the indicia "12" and "1" on the clock face 62. During the second hour of operation, the urine output is delivered to the compartment 30 corresponding to the interval between the indicia "1" and "2," and so forth. As previously discussed, the V-shaped drainage opening 42 and the knife edges 58 at the upper ends of the partitions 32 cooperate to provide sharp cutoffs at the ends of the respective one-hour intervals.

Considering the manner in which the rotary urine receptacle 44 is mounted for rotation and is driven, the receptacle is provided with a central web 64 having a central boss 66 lying on the axis of the urinometer 10. The boss 66 is provided at its lower end with a conical pivot socket or thrust bearing socket 68 for a conical pivot or thrust bearing 70 carried by the partitions 30 of the container 12. Thus, the thrust bearing means provided by the pivot 70 and the socket 68 serves to rotatably mount the urine receptacle 44 on the container 12.

The boss 66 is provided at its upper end with a diametral socket 72 of square cross section to receive a diametral drive element 74 of similiar cross section which is carried by the shaft 76 of the clock motor 46. The rotary urine receptacle 44, which is preferably made of a suitable plastic material, is provided along one edge of the socket 72 with a flexible and resilient lip 78 adapted to overlie one edge of the drive element 74 to releasably secure it in its socket 72. With this construction, removal of the cover 14 results in simultaneous removal of the rotary urine receptacle 44, whereupon the receptacle may be detached from the cover and the motor 46 by simply pulling them apart so as to pull the drive element 74 past the detent lip 78. To facilitate engagement and disengagement of the drive element 74 and its socket 72, the boss 66 is provided intermediate its ends with diametrally opposed ears forming a handle 80.

As is conventional with clock motors, the clock motor 46 is provided therein with a slip clutch which permits setting the pointer 60 on the rotary urine receptacle 44 to "zero," i.e., to "12" on the clock face 62, after the drive element 74 has been engaged with its socket 72 and prior to placing the urinometer 10 in operation. To facilitate such "zeroing" of the pointer 60, the cover 14 is provided with a radially-outwardly-extending annular flange 82 having on its lower side a clock face 84, FIG. 9, which corresponds to the clock face 62. It will be understood that the clock face 84 is a mirror image of the clock face 62 to the extent that the indicia on the clock face 84 increase numerically in the counterclockwise, instead of the clockwise, direction.

It is thought that the mode of operation of the urinometer 10 of the invention will be clear from the foregoing without further description. It will also be apparent that the only components of the device which are contacted by urine, viz., the inlet plug 50, the rotary urine receptacle 44 and the container 12, are all readily separable from the remaining components to facilitate cleaning and sterilization. In addition, the clock motor 46 may be connected to the cover 14 in such a manner as to facilitate sterilization of the cover if necessary.

Although an exemplary embodiment of the invention has been disclosed herein for purposes of illustration, it will be understood that various changes, modifications and substitutions may be incorporated in such embodiment without departing from the spirit of the invention as defined by the claims which follow.

1. In a urinometer, the combination of:
   (a) a housing including an upright container having a substantially vertical axis;
   (b) partitions in said container and dividing same into compartments of equal angular extents angularly spaced about said axis;
   (c) a urine receptacle carried by said housing and rotatable about said axis above said compartments;
   (d) said receptacle having a bottom wall sloping downwardly to a circumferentially-narrow drainage opening sequentially positionable above and in gravity communication with said compartments as said receptacle rotates about said axis so as to discharge urine into said compartments in sequence;
   (e) said partitions having knife edges at their upper ends below the path of said drainage opening to provide a sharp cutoff of gravity flow of urine from said drainage opening into each of said compartments as said receptacle rotates;
   (f) means carried by said housing and connected to said receptacle for rotating said receptacle about said axis at a constant, predetermined speed so as to maintain said drainage opening above and in communication with said compartments in sequence throughout equal, predetermined time intervals; and
   (g) means for delivering urine from a patient to said receptacle.

2. In a urinometer, the combination of:
   (a) a housing including an upright container having a substantially vertical axis;
   (b) partitions in said container and dividing same into compartments of equal angular extents angularly spaced about said axis;
   (c) a urine receptacle carried by said housing and rotatable about said axis above said compartments;
   (d) said receptacle having a bottom wall sloping downwardly to a circumferentially-narrow drainage opening sequentially positionable above and in gravity communication with said compartments as said receptacle rotates about said axis so as to discharge urine into said compartments in sequence;
   (e) said partitions having knife edges at their upper ends below the path of said drainage opening to provide a sharp cutoff of gravity flow of urine from said drainage opening into each of said compartments as said receptacle rotates;
   (f) said drainage opening extending radially outwardly and being V-shaped to form a circumferentially-thin urine stream;
   (g) means carried by said housing and connected to said receptacle for rotating said receptacle about said axis at a constant, predetermined speed so as to maintain said drainage opening above and in communication with said compartments in sequence through equal, predetermined time intervals; and
   (h) means for delivering urine from a patient to said receptacle.

3. In a urinometer, the combination of:
   (a) a housing including an upright container having a substantially vertical axis;
   (b) partitions in said container and dividing same into compartments of equal angular extents angularly spaced about said axis;
   (c) a urine receptacle carried by said housing and rotatable about said axis above said compartments;
   (d) said receptacle having a bottom wall sloping downwardly to a circumferentially-narrow drainage opening sequentially positionable above and in gravity communication with said compartments as said receptacle rotates about said axis so as to discharge urine into said compartments in sequence;
   (e) said partitions having knife edges at their upper ends below the path of said drainage opening to provide a sharp cutoff of gravity flow of urine from said drainage opening into each of said compartments as said receptacle rotates;
   (f) each of said compartments having a portion of reduced cross sectional area at its lower end;
   (g) means carried by said housing and connected to said receptacle for rotating said receptacle about said axis at a constant, predetermined speed so as to maintain said drainage opening above and in communication with said compartments in sequence throughout equal, predetermined time intervals; and
   (h) means for delivering urine from a patient to said receptacle.

4. In a urinometer, the combination of:
   (a) an upright cylindrical container open at its upper end;
   (b) a cover for said container releasably securable to the upper end thereof;
   (c) means for releasably securing said cover to the upper end of said container;
   (d) partition means in said container and providing partitions dividing said container into compartments of equal angular extents angularly spaced about the axis of said container;
   (e) a urine receptacle carried by said container and rotatable about said axis above said compartments;
   (f) said receptacle having a drainage opening sequentially positionable above and in gravity communication with said compartments as said receptacle rotates about said axis so as to discharge urine into said compartments in sequence;
   (g) a motor carried by said cover and connected to said receptacle for rotating said receptacle about said axis at a constant, predetermined speed so as to maintain said drainage opening above and in communication with said compartments in sequence throughout equal, predetermined time intervals; and
   (h) passage means extending through said cover and terminating above and in gravity communication with said receptacle for delivering urine from a patient to said receptacle.

5. In a urinometer, the combination of:
   (a) an upright cylindrical container open at its upper end;
   (b) a cover for said container releasably securable to the upper end thereof;
   (c) means for releasably securing said cover to the upper end of said container;
   (d) partition means in said container and providing partitions dividing said container into compartments of equal angular extents angularly spaced about the axis of said container;

(e) a urine receptacle carried by said container and rotatable about said axis above said compartments;

(f) said receptacle including an annular trough having a bottom wall sloping downwardly to a circumferentially-narrow drainage opening sequentially positionable above and in gravity communication with said compartments as said receptacle rotates about said axis so as to discharge urine into said compartments in sequence;

(g) said partitions having knife edges at their upper ends below the path of said drainage opening to provide a sharp cutoff of gravity flow of urine from said drainage opening into each of said compartments as said receptacle rotates;

(h) a motor carried by said cover and connected to said receptacle for rotating said receptacle about said axis at a constant, predetermined speed so as to maintain said drainage opening above and in communication with said compartments in sequence throughout equal, predetermined time intervals; and (i) passage means extending through said cover and terminating above and in gravity communication with said trough for delivering urine from a patient to said receptacle.

6. In a urinometer, the combination of:

(a) an upright cylindrical container open at its upper end;

(b) a cover for said container releasably securable to the upper end thereof;

(c) means for releasably securing said cover to the upper end of said container;

(d) partition means in said container and providing partitions dividing said container into compartments of equal angular extents angularly spaced about the axis of said container;

(e) a urine receptacle carried by said container and rotatable about said axis above said compartments;

(f) disengageable thrust bearing means on said receptacle and on said container and lying on said axis for releasably supporting said receptacle on said container for rotation about said axis;

(g) said receptacle including an annular trough having a bottom wall sloping downwardly to a drainage opening sequentially positionable above and in gravity communication with said compartments as said receptacle rotates about said axis so as to discharge urine into said compartments in sequence;

(h) a motor carried by said cover and connected to said receptacle for rotating said receptacle about said axis at a constant, predetermined speed so as to maintain said drainage opening above and in communication with said compartments in sequence throughout equal, predetermined time intervals; and (i) passage means extending through said cover and terminating above and in gravity communication with said trough for delivering urine from a patient to said receptacle.

7. In a urinometer, the combination of:

(a) an upright cylindrical container open at its upper end;

(b) a cover for said container releasably securable to the upper end thereof;

(c) means for releasably securing said cover to the upper end of said container;

(d) partition means in said container and providing partitions dividing said container into compartments of equal angular extents angularly spaced about the axis of said container;

(e) a urine receptacle carried by said container and rotatable about said axis above said compartments;

(f) disengageable thrust bearing means on said receptacle and on said container and lying on said axis for releasably supporting said receptacle on said container for rotation about said axis;

(g) said receptacle including an annular trough having a bottom wall sloping downwardly to a drainage opening sequentially positionable above and in gravity communication with said compartments as said receptacle rotates about said axis so as to discharge urine into said compartments in sequence;

(h) a motor carried by said cover and coaxial with said receptacle for rotating said receptacle about said axis at a constant, predetermined speed so as to maintain said drainage opening above and in communication with said compartments in sequence throughout equal, predetermined time intervals;

(i) central connecting means releasably connecting said receptacle to said motor; and (j) passage means extending through said cover and terminating above and in gravity communication with said trough for delivering urine from a patient to said receptacle.

8. In a urinometer, the combination of:

(a) an upright cylindrical container open at its upper end;

(b) a cover for said container releasably securable to the upper end thereof;

(c) means for releasably securing said cover to the upper end of said container;

(d) partition means in said container and providing radial partitions dividing said container into compartments of equal angular extents angularly spaced about the axis of said container;

(e) a urine receptacle carried by said container and rotatable about said axis above said compartments;

(f) disengageable thrust bearing means on said receptacle and on said partition means and lying on said axis for releasably supporting said receptacle on said container for rotation about said axis;

(g) said receptacle including an annular trough having a bottom wall sloping downwardly to a drainage opening sequentially positionable above and in gravity communication with said compartments as said receptacle rotates about said axis so as to discharge urine into said compartments in sequence;

(h) a motor carried by said cover and coaxial with said receptacle for rotating said receptacle about said axis at a constant, predetermined speed so as to maintain said drainage opening above and in communication with said compartments in sequence throughout equal, predetermined time intervals;

(i) central connecting means within said trough and releasably connecting said receptacle to said motor; and (j) passage means extending through said cover and terminating above and in gravity communication with said trough for delivering urine from a patient to said receptacle.

9. In a urinometer, the combination of:

(a) an upright cylindrical container open at its upper end;

(b) a cover for said container releasably securable to the upper end thereof;

(c) means for releasably securing said cover to the upper end of said container;

(d) partition means in said container and providing partitions dividing said container into compartments of equal angular extents angularly spaced about the axis of said container;

(e) a urine receptacle carried by said container and rotable about said axis above said compartments;

(f) said receptacle having a drainage opening sequentially positionable above and in gravity communication with said compartments as said receptacle rotates about said axis so as to discharge urine into said compartments in sequence;

(g) a motor carried by said cover and connected to said receptacle for rotating said receptacle about said axis at a constant, predetermined speed so as to maintain said drainage opening above and in communication with said compartments in sequence throughout equal, predetermined time intervals;

(h) passage means extending through said cover and terminating above and in gravity communication with said receptacle for delivering urine from a patient to said receptacle;

(i) a pointer on said receptacle in vertical alignment with said drainage opening; and (j) a clock face on said cover relative to which said pointer is movable and which is observable from above said cover, said clock face having indicia angularly spaced about the axis of said container and respectively vertically aligned with said partitions.

10. In a urinometer, the combination of:

(a) an upright cylindrical container open at its upper end;

(b) a cover for said container releasably securable to the upper end thereof;

(c) means for releasably securing said cover to the upper end of said container;

(d) partition means in said container and providing partitions dividing said container into compartments of equal angular extents angularly spaced about the axis of said container;

(e) a urine receptacle carried by said container and rotatable about said axis above said compartments;

(f) said receptacle having a drainage opening sequentially positionable above and in gravity communication with said compartments as said receptacle rotates about said axis so as to discharge urine into said compartments in sequence;

(g) a motor carried by said cover and connected to said receptacle for rotating said receptacle about said axis at a constant, predetermined speed so as to maintain said drainage opening above and in communication with said compartments in sequence throughout equal, predetermined time intervals;

(h) passage means extending through said cover and terminating above and in gravity communication with said receptacle for delivering urine from a patient to said receptacle;

(i) a pointer on said receptacle in vertical alignment with said drainage opening;

(j) a clock face on said cover relative to which said pointer is movable and which is observable from above said cover, said clock face having indicia angularly spaced about the axis of said container and respectively vertically aligned with said partitions; and (k) said cover having thereon a second clock face which is observable from below said cover and which registers with and is a mirror image of the first clock face mentioned.

11. In a urinometer, the combination of:

(a) an upright container having a substantially vertical axis;

(b) partitions in said container and dividing same into compartments of equal angular extents angularly spaced about said axis;

(c) a urine receptacle above said compartments;

(d) said receptacle having a bottom wall sloping downwardly to a circumferentially-narrow drainage opening spaced from said axis;

(e) means for relatively rotating said receptacle and said container about said axis so as to sequentially position said drainage opening above and in gravity communication with said compartments to discharge urine from said receptacle into said compartments in sequence;

(f) said partitions having knife edges at their upper ends to provide a sharp cutoff of gravity flow of urine from said drainage opening into each of said compartments in response to relative rotation of said receptacle and said container;

(g) said means for relatively rotating said receptacle and said container operating at a constant, predetermined speed so as to maintain said drainage opening above and in communication with said compartments in sequence throughout equal, predetermined time intervals; and (h) means for delivering urine from a patient to said receptacle.

References Cited by the Examiner
UNITED STATES PATENTS

| | | | |
|---|---|---|---|
| 223,034 | 12/79 | Douglass | 73—424 |
| 2,792,836 | 5/57 | Reynolds et al. | 73—424 X |

RICHARD C. QUEISSER, *Primary Examiner.*

DAVID SCHONBERG, *Examiner.*